(12) United States Patent
Ford

(10) Patent No.: US 10,626,726 B2
(45) Date of Patent: Apr. 21, 2020

(54) TUBULAR ADHESION TURBINE OR PUMP

(71) Applicant: BOUNDARY TURBINES INC, Spruce Grove (CA)

(72) Inventor: Darrell Ford, Spruce Grove (CA)

(*) Notice: Subject to any disclaimer, the term of this patent is extended or adjusted under 35 U.S.C. 154(b) by 170 days.

(21) Appl. No.: 15/742,444

(22) PCT Filed: Jul. 11, 2016

(86) PCT No.: PCT/CA2016/050813
§ 371 (c)(1),
(2) Date: Jan. 5, 2018

(87) PCT Pub. No.: WO2017/004725
PCT Pub. Date: Jan. 12, 2017

(65) Prior Publication Data
US 2018/0216463 A1 Aug. 2, 2018

Related U.S. Application Data

(60) Provisional application No. 62/190,352, filed on Jul. 9, 2015.

(51) Int. Cl.
| | |
|---|---|
| *F01D 1/36* | (2006.01) |
| *F04D 5/00* | (2006.01) |
| *F04D 17/16* | (2006.01) |
| *F04D 29/047* | (2006.01) |
| *F04D 29/057* | (2006.01) |

(52) U.S. Cl.
CPC .............. *F01D 1/36* (2013.01); *F04D 5/001* (2013.01); *F04D 17/161* (2013.01); *F04D 29/0473* (2013.01); *F04D 29/057* (2013.01); *F05D 2220/31* (2013.01); *Y02T 50/672* (2013.01)

(58) Field of Classification Search
CPC ........... F01D 1/36; F04D 5/001; F04D 17/161
See application file for complete search history.

(56) References Cited

U.S. PATENT DOCUMENTS

| 2,598,678 | A | * | 6/1952 | Dennis | .................... F04D 19/04 415/90 |
|---|---|---|---|---|---|
| 4,378,195 | A | | 3/1983 | Gamell | |
| 7,192,244 | B2 | | 3/2007 | Grande, III et al. | |

FOREIGN PATENT DOCUMENTS

| CN | 103306738 A | 9/2013 |
|---|---|---|
| SU | 985397 A1 | 12/1982 |

\* cited by examiner

*Primary Examiner* — Christopher Verdier
*Assistant Examiner* — Juan G Flores

(57) ABSTRACT

A boundary layer turbine having a housing with an inlet that receives pressurized fluid, a rotatable shaft extending through the housing, nested cylindrical tubes of progressively wider diameter connected coaxially about the shaft wherein adjacent tubes define a cylindrical fluid passageway there-between that is in fluid communication with the inlet and an outlet, and at least one nozzle coupled to the inlet configured to direct the flow of fluid from the inlet into the plurality of passageways and against the plurality of tubes at an angle to a normal plane to the curvature of the plurality of tubes and at an angle to the longitudinal axis of the shaft, wherein the angled flow of fluid imparts rotation to the plurality of tubes and the shaft and flows towards the outlet where the fluid is discharged, and wherein the rotating shaft may be used to provide kinetic energy.

10 Claims, 6 Drawing Sheets

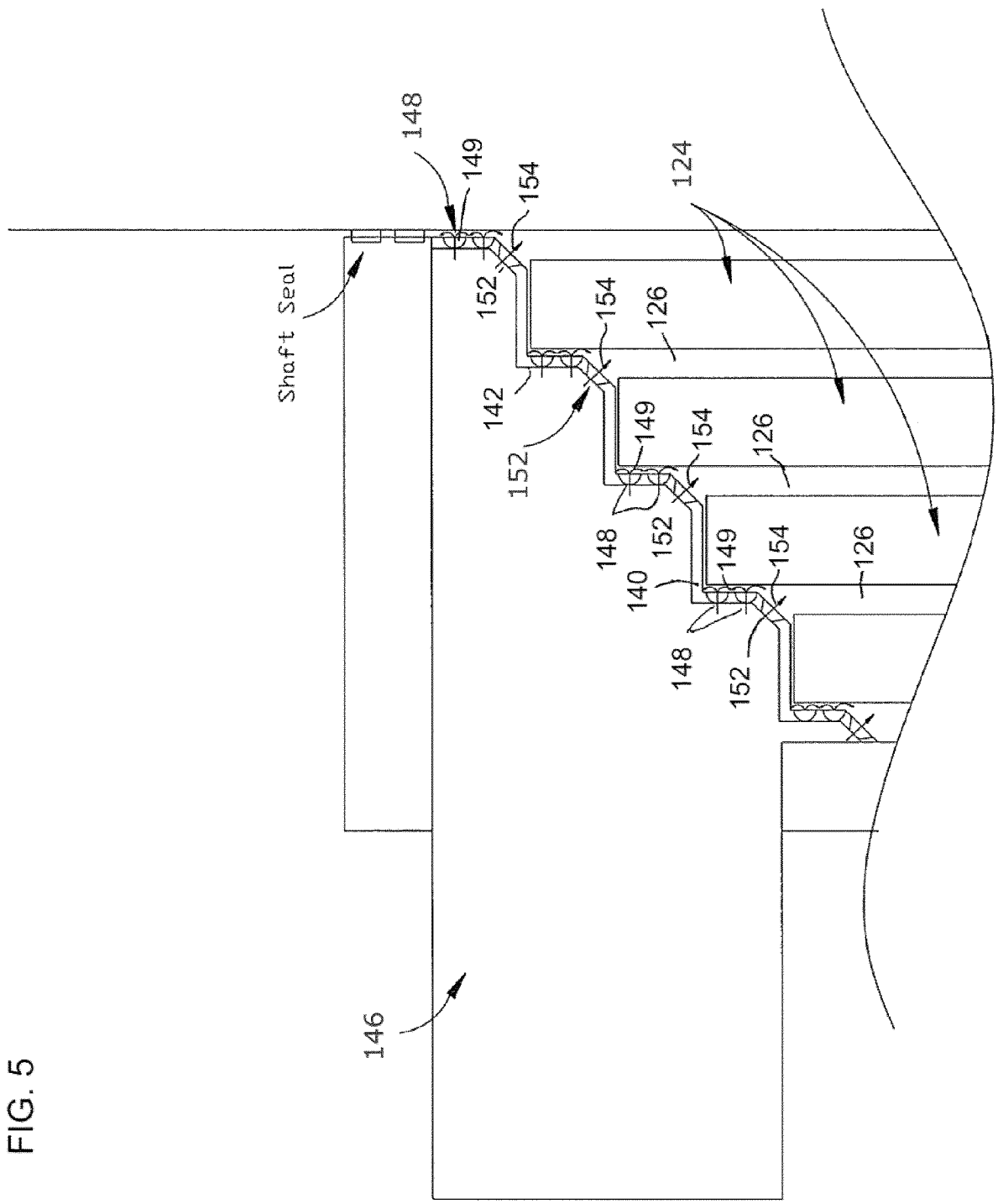

TUBULAR ADHESION TURBINE OR PUMP

BACKGROUND OF THE INVENTION

1. Field of Invention

The present invention relates to a boundary layer or adhesion turbine/pump and more particularly to an improved boundary layer or adhesion turbine/pump exhibiting simplification, increased speed of assembly, lower cost of construction, increased efficiency, and the elimination of the deformation and warpage problems inherent in the disk type boundary layer turbines and the intolerance of contamination inherent in conventional axial and inflow turbines.

2. Description of Related Art

Many prior art gas and steam turbines operate on the principle that the working fluid is propelled to and is expanded against the face of the turbine blades. This is true in both the radial inflow and axial flow turbines. The problems with both designs is the inability to handle particulates, contaminates and heavy moisture. Also, due to the frontal impact of the working fluid, stresses are more pronounced and a much heavier and higher alloy material is needed. This relates to higher initial cost and a necessity to utilize very clean and dry working fluid. High cost of manufacturing is also always inherent to conventional turbines due to the necessity of forgings, castings, and multi-axis machining operations.

Bladeless centripetal flow turbines, or boundary layer/adhesion/Tesla turbines, overcome some of these problems since they rely on a bladeless rotor comprising a stack of closely spaced discs whereby the working fluid interaction with the rotor is through viscosity of the fluid and its adhesion to the discs. But these also have limitations in some applications.

SUMMARY

The present invention addresses some of the limitations and surpasses efficiencies of turbo-machines, particularly in a configuration typical of gas turbines, jet engines and Tesla type boundary layer machinery, by being able to maintain precise geometry under stress conditions generated by very high rotational speeds, accommodate thermal growth of the materials under high temperature, overcome material warpage which is the key flaw in the disc type boundary turbines, and achieve a combination of expansion properties such as a conventional turbine (radial inflow or axial) and surfaces with adhesive properties such as Tesla disc turbine. Other advantages include eliminating the need for forgings, castings, and multi axis machining operations inherent in conventional turbine designs, providing a low manufacturing cost and still maintain high durability, dependability with increased efficiency, utilizing new materials and manufacturing methods—high temp plastics and composites, carbon fibers, 3D printed parts, and increase overall efficiency due to the ability to adjust the length of the tubes thereby increasing the residence time of the working fluid and corresponding energy extraction/recovery. As well, the present invention eliminates the exit losses of the compressor and the inlet losses of the turbine, as well as reducing the inlet losses of the compressor, allows for very high rotational speeds by utilizing 'fluid bearings' and external shaft bearings as well as longitudinal carrier bearings supporting the outside of the tube assembly at different positions along the length. The tube within tube type construction of the turbine of the present invention with fluid bearings at the 'hot' end and longitudinal bearings along the length and external 'cool' end bearings allows for a very strong and durable rotating assembly able to endure very high temps and rotational speeds, and is able to accommodate dirty or contaminated motive fluids ranging from gas phase fluids to full liquids with any combination in-between.

In some aspects the present invention provides a boundary layer or adhesion turbine comprising: a housing having an inlet end with an inlet and an outlet end with an outlet, the inlet being suitable for receiving a flow of pressurized fluid into the housing; a shaft extending longitudinally through the housing from the inlet end to the outlet end and journaled for rotation relative to the housing about the longitudinal axis of the shaft; a plurality of nested cylindrical tubes of progressively wider diameter arranged coaxially about the shaft and connected to the shaft such that adjacent tubes define a cylindrical fluid passageway there-between that is in fluid communication with the inlet and the outlet, thereby the plurality of tubes define a plurality of passageways; at least one nozzle coupled to the inlet configured to direct the flow of fluid from the inlet into the plurality of passageways and against the plurality of tubes at an angle to a normal plane to the curvature of the plurality of tubes and at an angle to the longitudinal axis of the shaft, wherein the angled flow of fluid imparts rotation to the plurality of tubes and the shaft and flows towards the outlet where the fluid is discharged, and wherein the rotating shaft may be used to provide kinetic energy.

In some embodiments, the apparatus may further comprise a disc member coaxially connected to the shaft and connected to the plurality of tubes at the outlet end, the disk member including a plurality of exhaust ports, each exhaust port in alignment with a passageway to allow fluid flow from the passageway to the outlet.

In some embodiments, each tube of the plurality of tubes may be shorter than the adjacent tube more proximal to the shaft such that the ends of the plurality of tubes near the inlet end are stepped towards the outlet end, thereby the plurality of passageways are likewise stepped such that the longest passageway is adjacent the shaft and the shortest passageway is furthest coaxially from the shaft.

In some embodiments, the inlet port may include a stepped wall portion that is closely complementary to the plurality of tubes such that each step of the wall portion is in close proximity to a portion of the adjacent tube, and the stepped wall and the inlet define a pressure chamber there-between.

In some embodiments, the at least one nozzle may comprise a plurality of fluid jets, each fluid jet is adjacent one passageway of the plurality of passageways and operable to direct a jet of fluid from the inlet into said one passageway to impart rotation to the plurality of tubes.

In some embodiments, the apparatus may further comprise a plurality of second jets, each second jet being on a step of the wall portion and in close proximity to an adjacent tube to direct a second jet of fluid directly against a portion of the adjacent turbine tube to create a fluid bearing seal between that step and the adjacent turbine tube.

In some embodiments, the at least one nozzle may comprise a plurality of fluid jets, each fluid jet is adjacent one passageway of the plurality of passageways and operable to direct a jet of fluid from the inlet into said one passageway at an angle to a normal plane to the curvature of the plurality of tubes and at an angle to the longitudinal axis of the shaft.

Other aspects and features of the present invention will become apparent to those of ordinary skill in the art upon review of the following description of embodiments of the invention in conjunction with the accompanying figures.

BRIEF DESCRIPTION OF THE DRAWINGS

In drawings which illustrate by way of example only embodiments of the invention:

FIG. 5 is a close up longitudinal section view of the apparatus of FIG. 1 showing only the top left side;

DETAILED DESCRIPTION

Figure 1:
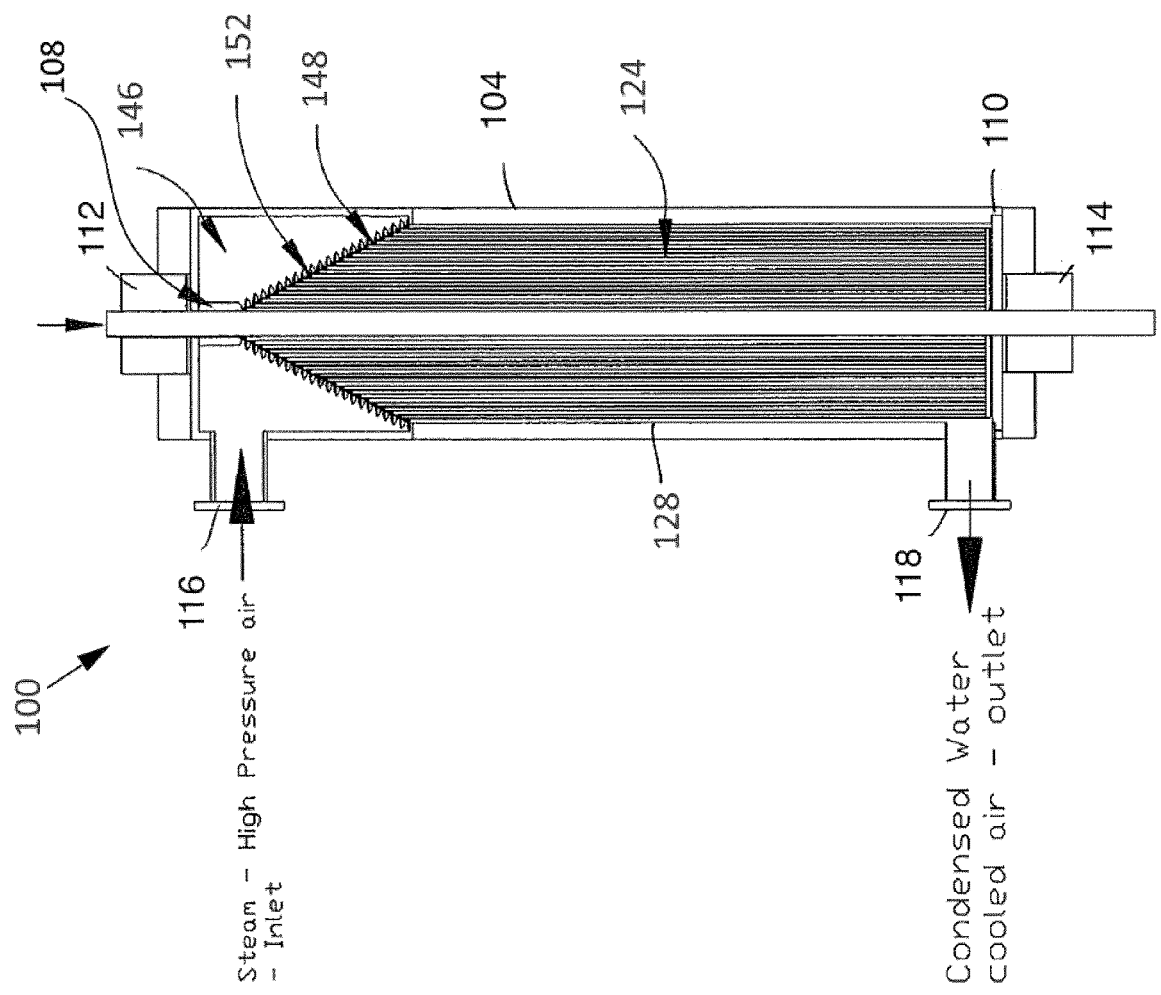
FIG. 1 is a longitudinal section view of a boundary layer turbine according to a first embodiment of the invention.
Figure 2:
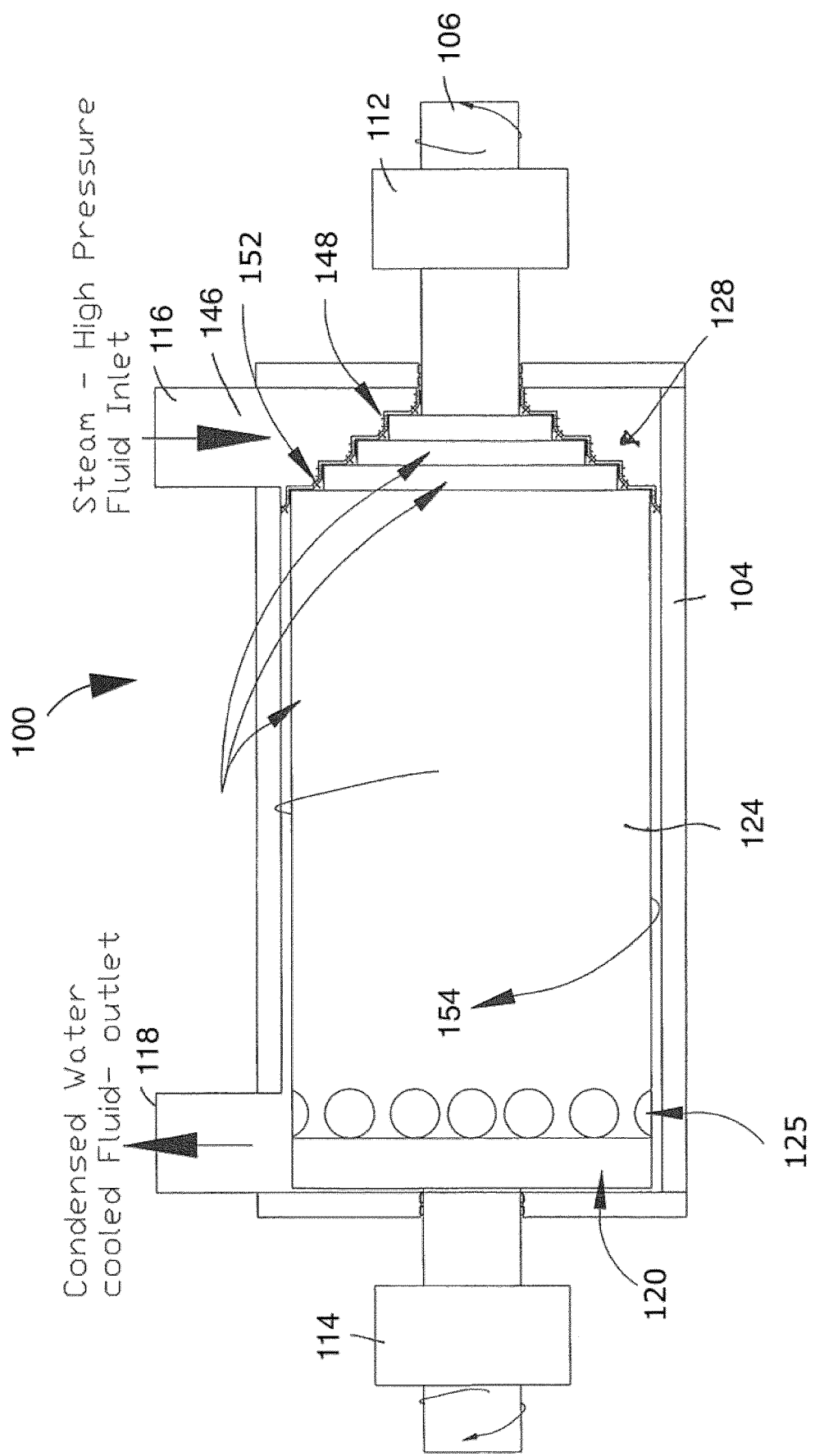
FIG. 2 is a longitudinal section view of the apparatus of FIG. 1 showing the internal turbine component in plan view.

Referring to FIGS. 1-5, a boundary layer or adhesion turbine (or pump) apparatus according to an embodiment of the invention is shown generally at 100. The turbine apparatus 100 comprises a housing 104 and a shaft 106 extending longitudinally through the housing 104 from an inlet end 108 of the housing to an outlet end 110. The shaft 106 is journaled for rotation relative to the housing 104 about its longitudinal axis by high speed bearings 112 and 114 at each end of the housing 104. The housing 104 is fluid tight except at an inlet port 116 and an outlet port 118. Connected to the shaft 106 via a disc or rotor hub 120, and extending coaxially about the shaft 106, is a plurality of nested progressively wider cylindrical tube elements such as tubes 124, also referred to herein as turbine tubes. Adjacent tubes 124 define a cylindrical space or fluid passageway 126 there-between, each of which is in fluid communication with the inlet port 116 and the outlet port 118, as will be described herein. In the illustrated embodiment, each successive outer turbine tube 124 is shorter than its neighboring inner turbine tube 124 such that the ends of the turbine tubes near the inlet port 116 are stepped towards the outlet port 118. Consequently, the cylindrical fluid passageways 126 are likewise stepped such that the longest passageway 126 is the one adjacent the shaft 106 and the shortest is the one furthest coaxially from the shaft. The walls of the turbine tubes 124 adjacent the rotor hub 120 include exhaust ports 125 that provide fluid communication between each cylindrical fluid passageway 126 and the outlet port 118. The turbine tubes 124, the rotor hub 120 and the shaft 106 collectively comprise the turbine 128.

As a general overview of operation, high pressure fluid enters the inlet port 116, and via a plurality of fluid jets 152 that each communicates with a cylindrical fluid passageway 126, streams of the high pressure fluid enter the cylindrical passageways 126 in a trajectory at an angle to a normal plane to the curvature of the tube and at an angle to the longitudinal axis of the shaft and against the adjacent tube 124. The boundary layer effect as a result of viscosity and adhesion of the fluid against the walls of the turbine tube 124 causes the shaft 106 to rotate in the direction of the fluid flow. The stream of fluid in each cylindrical fluid passageway 126 flows towards the outlet end and, via a plurality of outlets provided, the streams exit the passageways and coalesce as a low pressure stream that exits the outlet port 118 to the environment or to other mechanisms for further processing.

Figure 3:
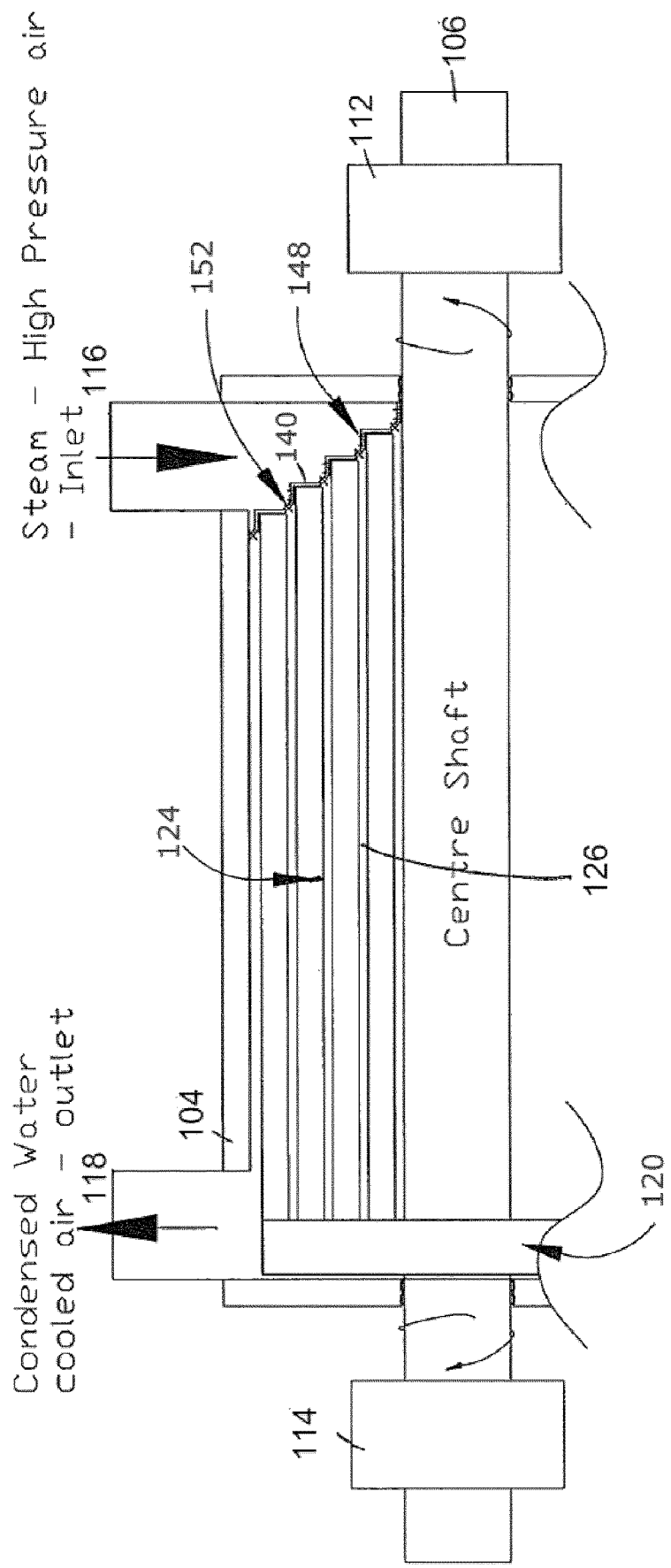
FIG. 3 is a longitudinal section view of the apparatus of FIG. 1 showing only the left side.
Figure 4:
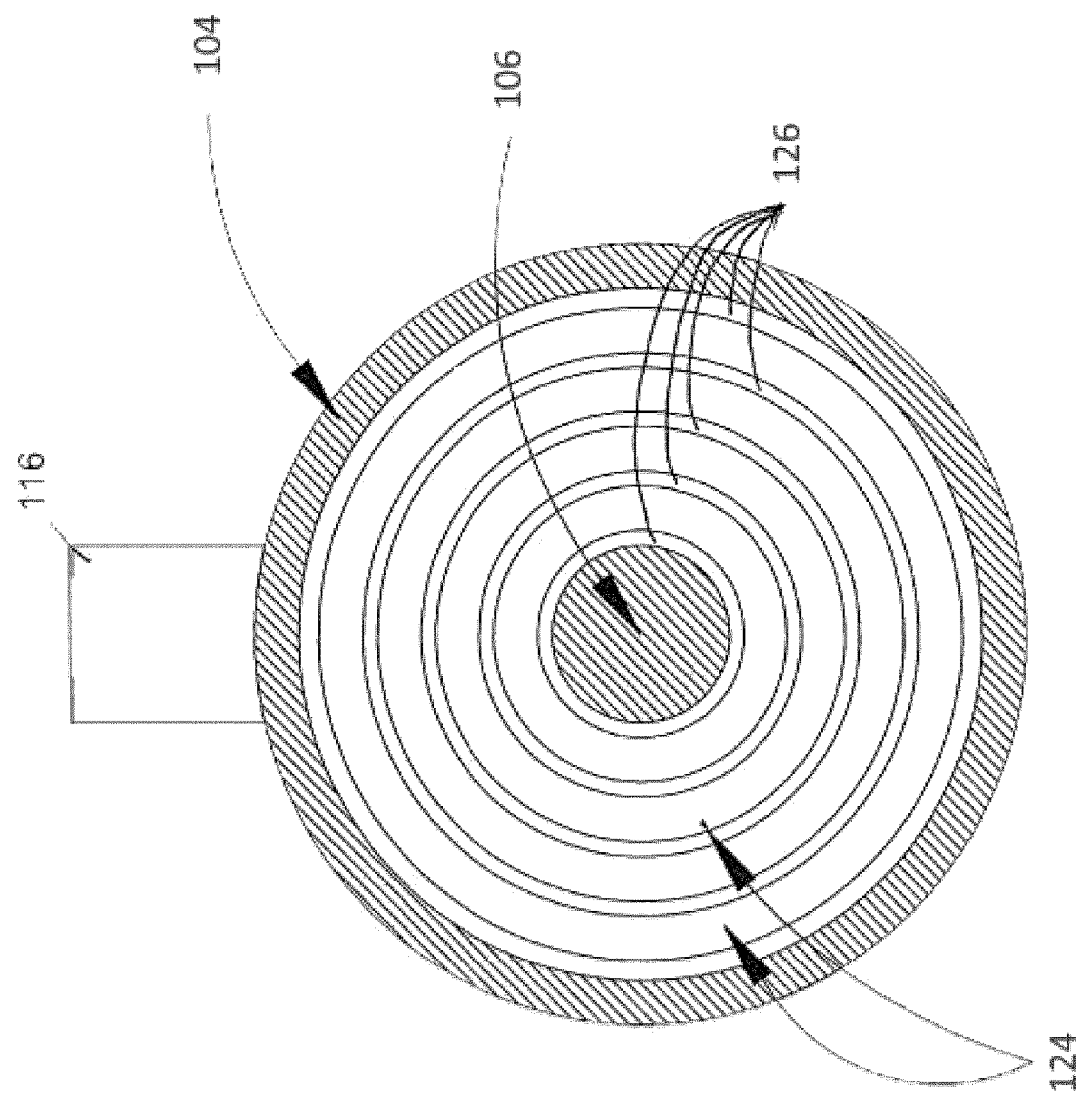
FIG. 4 is a cross section view of the apparatus of FIG. 1.

Referring to FIGS. 3 and 5, the inlet port 116 includes a stepped wall portion 140 that is closely complementary to the turbine tubes 124 such that each step 142 of the wall portion 140 is in close proximity to a portion of the adjacent turbine tube 124. The stepped wall 140 and the inlet port 116 define a pressure chamber 146 there between. Each step 142 includes one or more jets 148 (second jets) that allow a high pressure jet 149 of fluid to pass through the wall 140 and directly against a portion of the adjacent turbine tube 126 to create a fluid bearing seal between that step 142 in the wall 140 and the adjacent turbine tube 124.

Also referring to FIGS. 3 and 5, the stepped wall portion 140 includes a plurality of inlet motive jets 152 (fluid jets) each of which corresponds to a cylindrical fluid passageway 126. Each motive jet 152 is positioned to provide a jet of fluid 154 into the adjacent fluid passageway 126 in a direction at an angle to a normal plane to the curvature of the plurality of tubes and at an angle to the longitudinal axis of the shaft as well as the longitudinal axis of the passageway such that the jet of fluid 154 acts upon the wall of the adjacent turbine tube 124. The jets of fluid 154 acting on their respective turbine tubes 124 causes the turbine 128 to spin about the shaft 106 as a result of the boundary layer effect whereby drag is created on the turbine tubes 124 by means of the viscosity and the adhesion of the surface layer of the jets of fluid 154. As the jets of fluid 154 slow and add energy to the turbine 128, they spiral towards the rotor hub 120 of the turbine and flow out of the cylindrical fluid passageways 126 via the exhaust ports 125, to be eventually exhausted out of the apparatus via the outlet port 118.

Figures 6, 7:
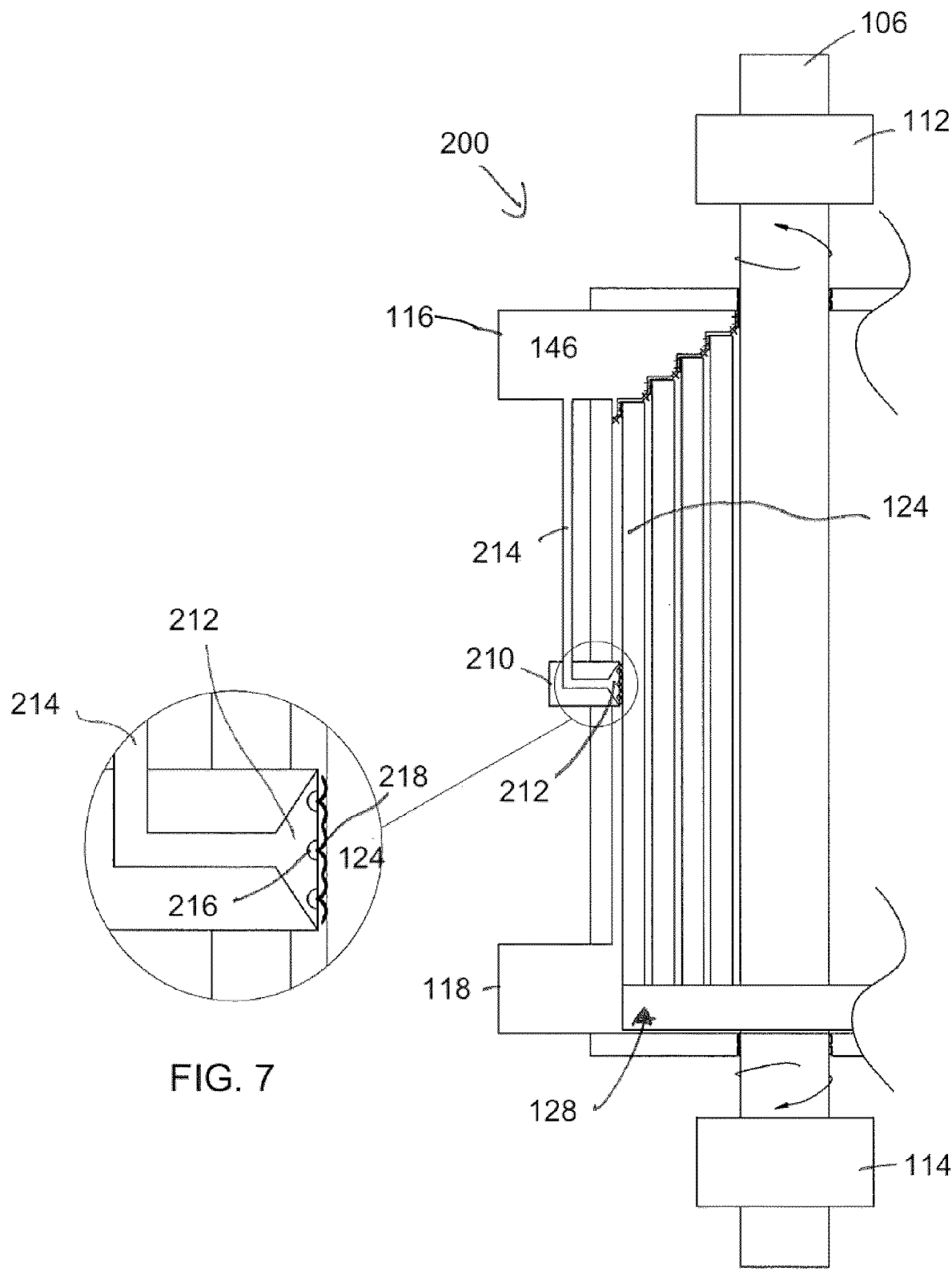
FIG. 6 is a longitudinal section view of a boundary layer turbine according to another embodiment of the invention showing an example of a longitudinal carrier bearing.
FIG. 7 is a close up view of the longitudinal carrier bearing of the apparatus of FIG. 6.

Referring to FIGS. 6 and 7, another embodiment of a boundary layer or adhesion turbine (or pump) is shown generally at 200. The turbine apparatus 200 comprises the same turbine 128, housing 104 and other structures as described and illustrated in the embodiment 100, with the exception that one or more longitudinal carrier bearings 210 are provided along the length of the turbine apparatus 200 to provide fluid bearing seals along the length of the turbine 128. In FIG. 6, one such longitudinal carrier bearing 210 is illustrated, but more may be provided as required by the design parameters of the specific turbine apparatus 200. Thus longitudinal carrier bearing 210 comprises a high pressure chamber 212 that is in fluid communication with pressure chamber 146 of the inlet port 116. High pressure fluid enters the chamber 212 and is then expelled through one or more jets 216 directly against a portion of the adjacent turbine tube 126 to create a fluid bearing seal 218 between that longitudinal carrier bearing 210 and the adjacent turbine tube 124, similarly to the jets 148 described above in the stepped wall portion 140.

The length of the turbine tubes 124, hence that of the turbine 128, or the number of turbine tubes 124 provided coaxially around the shaft 106 may vary among the embodiments of the present invention depending on the application and the properties of the fluid intended to be used to power the turbine apparatus. For example, devices intended to handle larger throughput of fluid may require more turbine tube elements. And the length of the turbine 128 may depend on the amount of potential energy that can be extracted from the fluid into kinetic energy of the spinning turbine 128. For example, in power generation applications using high pressure steam as the driving fluid, the length of the turbine 128 may be selected such that whereas high pressure steam enters the inlet port 116, the exhaust stream at the outlet port 118 comprises nearly condensed water, whereby most of the energy of the steam has been extracted into kinetic energy of the rotating turbine 128.

As well, it is well understood in the art that a device that operates as a turbine in one direction of fluid flow to extract kinetic energy from the fluid, can operate as a pump in the opposite direction of the fluid flow by inputting kinetic energy into the device. Accordingly, it will be understood by persons skilled in the art that the present invention also provides boundary layer pumps in that if the shaft 106 is rotated mechanically, a fluid flow will be established through the cylindrical passageways 126 based on the boundary layer effect in the direction from the outlet port 118 (which in a pump would be the inlet) towards the inlet port 116 (which in a pump would be the outlet). Hence the principle of the turbine 120 comprising of coaxially mounted turbine tubes 124 of the present invention can be used to pump fluids as well.

It is understood that the embodiments described and illustrated herein are merely illustrative of embodiments of the present invention. Other embodiments that would occur to those skilled in the art are contemplated within the scope of the present invention. The invention may include variants not described or illustrated herein in detail. Thus, the embodiments described and illustrated herein should not be considered to limit the invention as construed in accordance with the accompanying claims.

What is claimed is:

1. A boundary layer or adhesion turbine comprising:
   a. a housing having an inlet end with an inlet and an outlet end with an outlet, the inlet being suitable for receiving a flow of pressurized fluid into the housing;
   b. a shaft extending longitudinally through the housing from the inlet end to the outlet end and journaled for rotation relative to the housing about a longitudinal axis of the shaft;
   c. a plurality of nested cylindrical tubes of progressively wider diameter arranged coaxially about the shaft and connected to the shaft such that adjacent tubes define a cylindrical fluid passageway there-between that is in fluid communication with the inlet and the outlet, thereby the plurality of tubes define a plurality of passageways;
   d. at least one nozzle coupled to the inlet configured to direct the flow of fluid from the inlet into the plurality of passageways and against the plurality of tubes at an angle to a normal plane to the curvature of the plurality of tubes and at an angle to the longitudinal axis of the shaft, wherein the angled flow of fluid imparts rotation to the plurality of tubes and the shaft and flows towards the outlet where the fluid is discharged, and wherein the rotating shaft may be used to provide kinetic energy, and
   e. a disc member coaxially connected to the shaft and connected to the plurality of tubes at the outlet end, the disc member including a plurality of exhaust ports in fluid communication with the passageways to allow fluid flow from the passageways to the outlet.

2. The apparatus as claimed in claim 1 wherein each tube of the plurality of tubes is shorter than the adjacent tube more proximal to the shaft such that the ends of the plurality of tubes near the inlet end are stepped towards the outlet end such that the plurality of passageways are likewise stepped such that the longest passageway is adjacent the shaft and the shortest passageway is furthest coaxially from the shaft.

3. The apparatus as claimed in claim 2 wherein the inlet includes a stepped wall portion that is closely complementary to the plurality of tubes such that each step of the wall portion is in close proximity to a portion of the adjacent tube, and the stepped wall and the inlet define a pressure chamber there-between.

4. The apparatus as claimed in any one of claims 1-3 wherein the at least one nozzle comprises a plurality of fluid jets, each fluid jet is adjacent one passageway of the plurality of passageways and operable to direct a jet of fluid from the inlet into said one passageway to impart rotation to the plurality of tubes.

5. The apparatus as claimed in claim 4 further comprising a plurality of second jets, each second jet being on a step of the wall portion and in close proximity to an adjacent tube to direct a second jet of fluid directly against a portion of the adjacent tube to create a fluid bearing seal between that step and the portion of the adjacent tube.

6. The apparatus as claimed in claim 4 wherein each fluid jet is operable to direct the jet of fluid into said one passageway at an angle to a normal plane to the curvature of the plurality of tubes and at an angle to the longitudinal axis of the shaft.

7. The apparatus as claimed in claim 1 wherein each tube of the plurality of tubes is shorter than the adjacent tube such that the ends of the plurality of tubes are stepped in such that the plurality of passageways are likewise stepped.

8. The apparatus as claimed in claim 7 wherein the inlet port includes a stepped wall portion that is closely complementary to the plurality of tubes such that each step of the wall portion is in close proximity to a portion of the adjacent tube, and the stepped wall and the inlet define a pressure chamber there-between.

9. The apparatus as claimed in any one of claims 7-8 wherein the at least one nozzle comprises a plurality of fluid jets, each fluid jet is adjacent one passageway of the plurality of passageways and operable to direct a jet of fluid from the inlet into said one passageway to impart rotation to the plurality of tubes.

10. The apparatus as claimed in claim 9 further comprising a plurality of second jets, each second jet being on a step of the wall portion and in close proximity to an adjacent tube to direct a second jet of fluid directly against a portion of the adjacent tube to create a fluid bearing seal between that step and the portion of the adjacent tube.

* * * * *